Patented Nov. 9, 1937

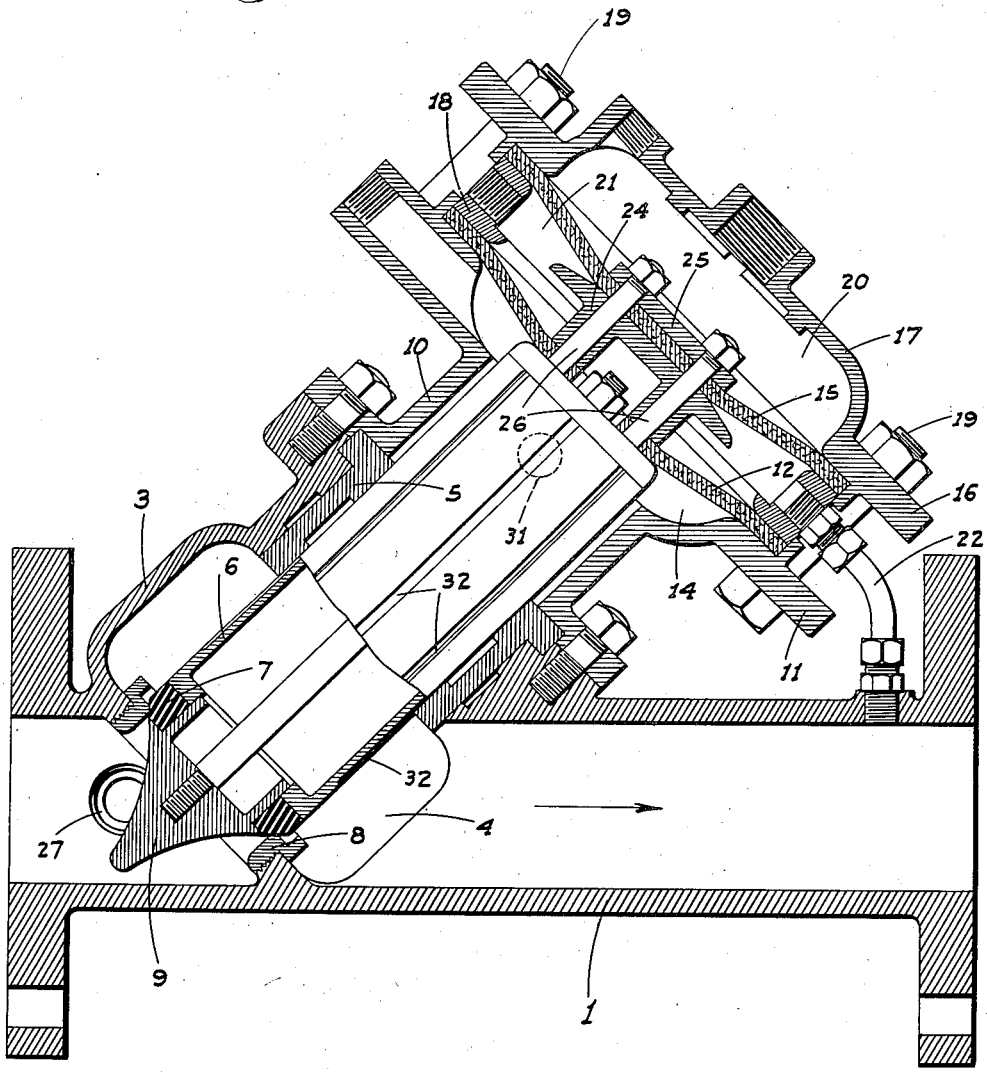

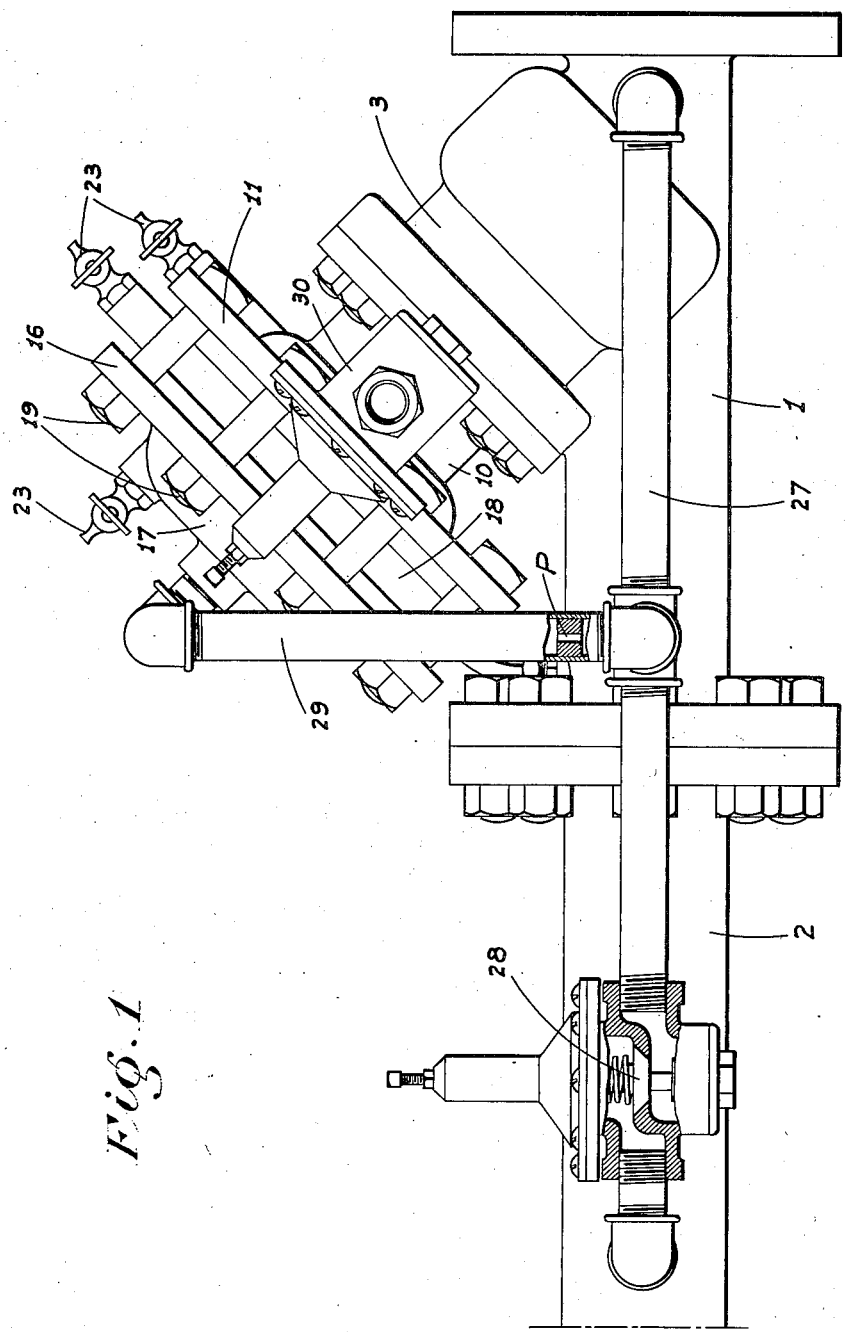

2,098,696

UNITED STATES PATENT OFFICE 2,098,696

WATER REDUCING VALVE

Arthur Joseph Sparrow, Oakland, Calif., assignor to Charles M. Bailey Company, Inc., San Francisco, Calif., a corporation of California Application January 22, 1936, Serial No. 60,223

3 Claims. (Cl. 137—153)

This invention relates to water reducing valves, my principal objects being to provide a valve of this character having a number of advantages over such valves as they are at present constructed and as will be seen later. As a result of my valve improvements increased efficiency and smoothness of operation under all conditions is obtained, there is complete freedom from sticking and possible failure to function if not used for some time; greater ease in cleaning out the valve parts when necessary is obtained; longer life without giving trouble or needing repairs is had; and very close regulation of the valve to suit different working conditions is permitted.

These and other objects I accomplish by means of such structure and relative arrangement of parts as will fully appear by a perusal of the following specification and claims.

In the drawings similar characters of reference indicate corresponding parts in the several views:

Figure 1 is a side elevation of my improved water reducing valve and the connecting piping; one check or pilot valve being shown in section.

Figure 2 is an enlarged sectional elevation of the reducing valve detached looking from the side opposite to Figure 1, and with the piping and other fittings removed.

Referring now more particularly to the characters of reference on the drawings, the numeral 1 denotes a horizontal or straight water passage member flanged at its ends for connection to the standard and similarly flanged pipe 2 of the water flow line in which the member 1 is interposed.

Formed with said member 1 and extending upwardly therefrom at an angle of substantially 45 degrees in the direction away from the high pressure or up stream end of the member is a valve casing 3. This includes a relatively large lower cylindrical chamber 4 cutting into and communicating with the passage of the member 1. The upper end of the casing is of reduced size relative to the chamber 4 and supports a guide and bearing sleeve 5 for a preferably hollow cylindrical valve body or stem 6, whose axis is of course also disposed at 45 degrees to the axis of the member 1.

Adjacent its lower end the stem 6 is provided with an annular valve ring 7 of rubber or the like which cooperates with a valve seat cup 8 removably secured in the lower end of the casing 3 and extending diagonally across the member 1 so that when the ring 7 is seated, it forms a closure between the opposite ends of said member 1, as will be evident.

Removably secured on the valve stem below the ring 7 and overlapping the same to removably clamp it in place is a substantially cone or needle shaped point 9 which thus projects into the member 1 on the high pressure side of the valve seat and presents a substantially stream lined surface to the flow of water, materially reducing the friction of such flow.

Removably secured on and projecting upwardly from the casing 3 and holding the sleeve 5 against removal is a tubular extension 10, somewhat larger in bore than said sleeve and practically forming a part of the valve casing itself. This extension at its upper end, slightly above the top of the valve stem when the latter is seated, is formed with an outwardly projecting flange 11. This flange provides a clamping seat for the peripheral portion of a flexible diaphragm 12 preferably of leather which extends across the top of the valve stem. The space between this diaphragm and the extension 10 forms a low pressure chamber 14.

Above and spaced from the diaphragm 12 is a similar diaphragm 15, the peripheral portion of which bears against a flange 16 formed on a cap 17. A circular band 18 between the diaphragms engages the adjacent peripheral portions of the same, said portions being clamped in water-tight relation with the band and with the flanges by bolts 19 connecting the flanges outwardly of the band. From the above construction it will be seen that the valve casing 3, the extension 10, the band 18, and cap 17 form a water-tight housing or casing in which the valve structure and its control elements are enclosed.

The interior of the cap 17 above the diaphragm 15 forms a high pressure chamber 20 while the space enclosed between the diaphragms forms an equalizing chamber 21; communication between said chamber and the member 1 on the low pressure or down stream side of the same being had by a relatively small pipe 22 tapping the band 18. Relief cocks 23 are separately connected to the chambers 14, 20 and 21. The diaphragms are clamped together at the center and to the valve stem by means of a spacer 24 disposed therebetween, a washer 25 over the corresponding portion of the diaphragm 15, and bolts 26 extending through the washer and spacer into the top of the stem.

A pilot or by-pass pipe or conduit 27 (see Figure 1) extends from the high pressure side of the member 1 to a connection with the low pressure pipe 2 with a normally closed adjustable pilot valve 28 of standard character interposed in said pipe 27 and opening toward the low pressure or down stream side thereof. A lateral pipe 29 is connected to the pipe 27 intermediate the valve 28 and the high pressure end of the pipe 27 and leads to the cap 17, there being a restricted passage through said pipe 29, as indicated somewhat diagrammatically at P in Figure 1. A relief valve 30, which may be of the same nature as the pilot valve 28, communicates with the chamber 14 by means of a port 31 in the stem 6, said valve opening away from said chamber. Low pressure water is restrictedly admitted to the chamber 14 by grooves 32 cut lengthwise in the stem 6 and extending from below to above the sleeve 5.

In operation the high pressure water under the main valve and the low pressure water in the chamber 14 under the diaphragm 12 tends to force the valve open. High pressure water is also admitted to the chamber 20 above the diaphragm 15 through the restricted passage P in pipe 29. When a certain high pressure builds up in said chamber, it causes the valve to close on account of the fact that the diaphragm 15 has a greater exposed area than the diaphragm 12 and the pressure thus built up is sufficient to overcome the combined low pressure in the chamber 14 and the high pressure acting against the bottom of the main valve as above set out.

When the down stream pressure in the pipe line drops the pilot valve 28 opens and due to the restricted opening P, the high pressure bleeds from the chamber 20 through the pilot valve. This relieves the diaphragm 15 of the closing pressure thereagainst and causes said valve to open by reason of the removal of the pressures acting thereon. When the down stream pressure is then increased by the flow through the main line past the main valve, the pilot valve again closes and high pressure again builds up in the chamber 20 to cause the main valve to close.

Low pressure being always present in the chamber 21 between the diaphragms, a stabilizing effect is had preventing any fluttering or tendency to "hunt". The relief valve 30 prevents any building up of down stream pressure in the chamber 14. If the low pressure should build up too high in said chamber this relief valve opens and releases the water from the chamber 14 faster than it can be admitted through the valve stem grooves 32.

From the above description it will be seen that I obtain numerous advantages over the ordinary form of reducing valve. The needle type valve, the straight line flow of water past the same, and the arrangement of the valve at a 45 degree angle eliminate a pressure drop and increase the capacity of the valve. This feature is aided by the elimination of any packing glands, guide members etc. in the line of flow. The adjustable pilot valve arrangement which controls the flow to the upper diaphragm insures a close regulation of operation of the main valve being obtainable. The diaphragms will last indefinitely under normal conditions, and will not stick as do cup leathers as they have no friction surfaces. The valve can therefore be shut down for long periods (as when used in fire control apparatus) with the assurance that the valve will work when wanted. Also the difference in area of the diaphragms insures the easy and free movement of the valve.

No springs or weights are used in connection with the main valve to cause the different opening and closing pressures on the valve, and the action depends solely on the hydraulic balance between the different areas of the two diaphragms. The valve seat and the engaging ring 7 thereof, as well as the stream line needle point on the valve, being removable, they may be easily renewed when necessary. All the pilot piping being outside the main valve casing, it may be easily cleaned and is preferably made of copper to eliminate corrosion.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A reducing valve comprising a passage member adapted to form part of a liquid-flow line, means forming a closure in the member intermediate its ends to provide high and low pressure areas therein and comprising a valve seat fixed in the member and an axially movable valve engaging said seat, and having a stem projecting outwardly from said member, said valve opening in the direction of flow of the liquid, a casing structure into which the valve stem projects outwardly of the member, a pair of axially spaced diaphragms disposed at right angles to and beyond the valve stem, means securing the diaphragms to the stem, means securing the diaphragms about their periphery in the casing structure so as to form, with said structure, separate enclosed chambers on opposite sides of and between the diaphragms, passage means from the low pressure area of the member to the chamber nearest the same, passage means from said area to the chamber between the diaphragms, a conduit from the high pressure area of the member to the remaining chamber, and means between said conduit and the low pressure area of the member to allow the high pressure liquid to bleed from said remaining chamber when the low pressure in the member drops a predetermined amount relative to the high pressure.

2. A structure as in claim 1, with a normally closed petcock valve connected to the chamber between the diaphragms.

3. A reducing valve comprising a passage member adapted to form part of a liquid-flow line, means forming a closure in the member intermediate its ends to provide high and low pressure areas therein and comprising a valve seat fixed in the member and an axially movable valve engaging said seat, and having a stem projecting outwardly from said member, said valve opening in the direction of the flow of the liquid, a casing structure into which the valve stem projects outwardly of the member, a pair of axially spaced diaphragms disposed at right angles to and beyond the valve stem, means securing the diaphragms to the stem, means securing the diaphragms about their periphery in the casing structure so as to form, with said structure, separate enclosed chambers on opposite sides of and between the diaphragms, passage means from the low pressure area of the member to the chamber nearest the same, passage means from said area to the chamber between the diaphragms, a conduit from the high pressure area of the member to the remaining chamber, another conduit connecting said first named conduit and the low pressure side of the member, and an adjustable relief valve in said other conduit opening in the direction of said low pressure side.

ARTHUR JOSEPH SPARROW.